H. HORTENSTINE.
PROTECTOR FOR PNEUMATIC TIRES.
APPLICATION FILED MAR. 20, 1917.
1,247,534.
Patented Nov. 20, 1917.
2 SHEETS—SHEET 1.
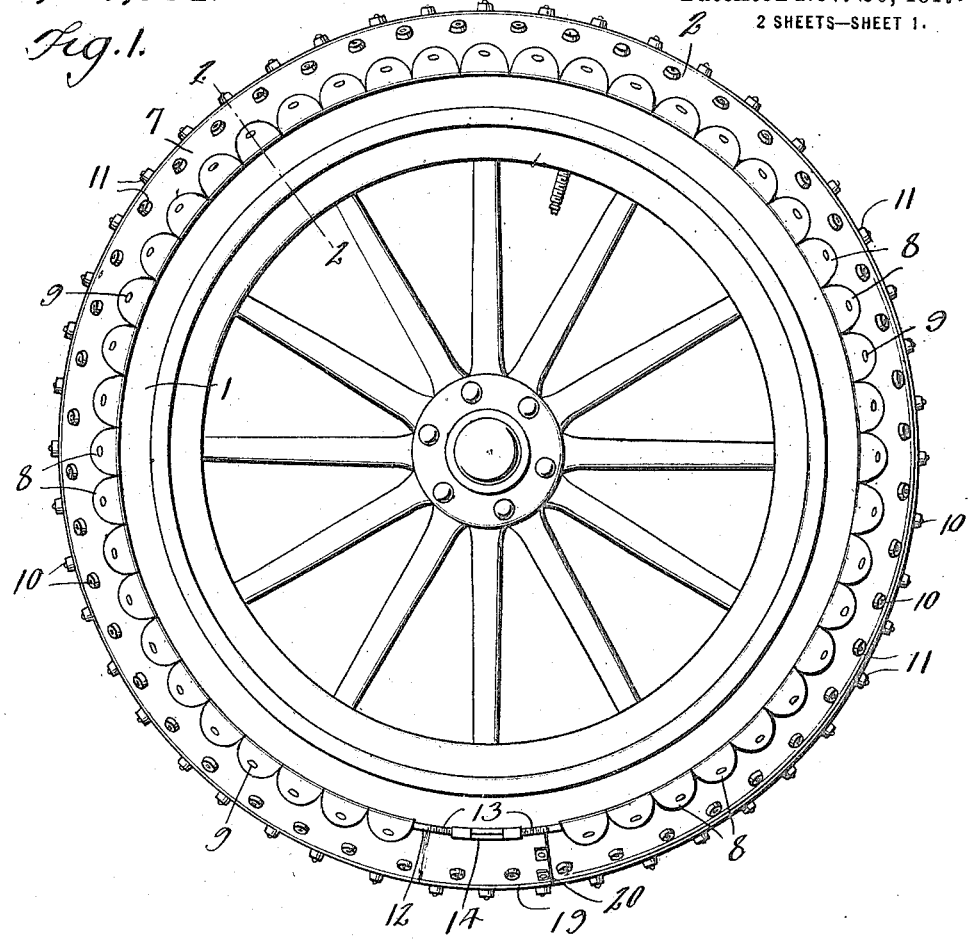
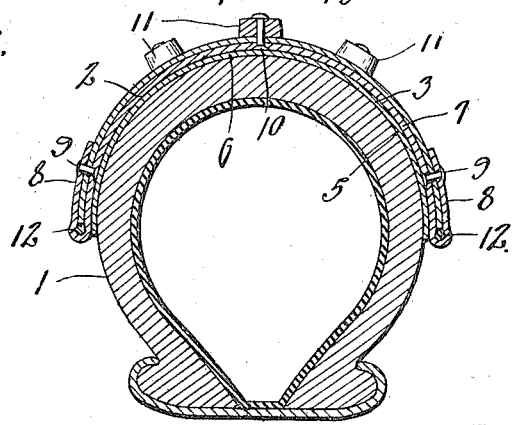
WITNESSES
INVENTOR
H. Hortenstine,
BY Victor J. Evans
ATTORNEY

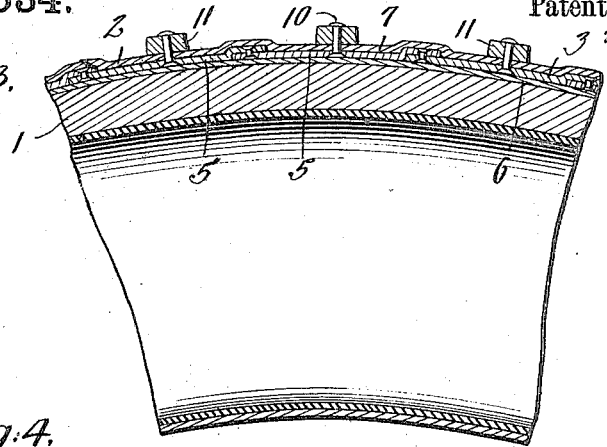
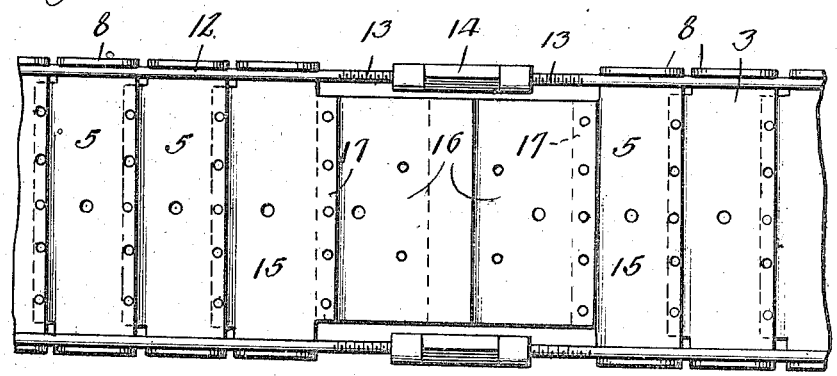
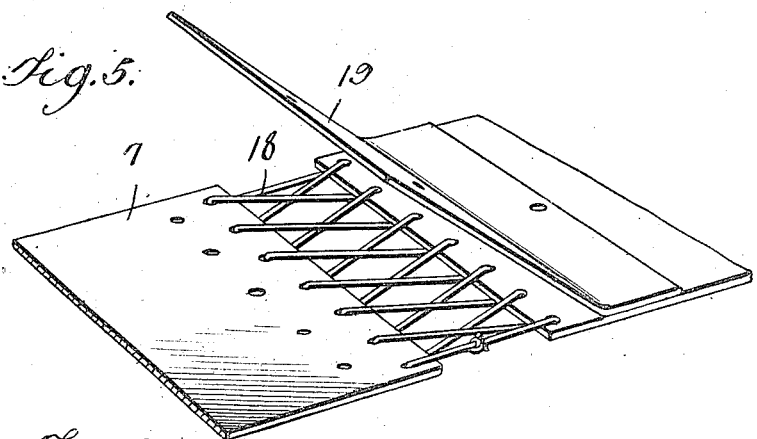
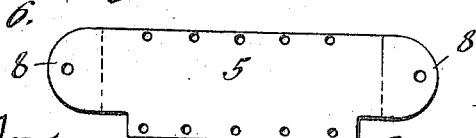

UNITED STATES PATENT OFFICE.

HENRY HORTENSTINE, OF GAYS, ILLINOIS.

PROTECTOR FOR PNEUMATIC TIRES.

1,247,534.  Specification of Letters Patent.  Patented Nov. 20, 1917.

Application filed March 20, 1917. Serial No. 156,171.

*To all whom it may concern:*

Be it known that I, HENRY HORTENSTINE, a citizen of the United States, residing at Gays, in the county of Moultrie and State of Illinois, have invented new and useful Improvements in Protectors for Pneumatic Tires, of which the following is a specification.

This invention relates to pneumatic tire protectors and comprehends the provision of a protector which may be removably secured to pneumatic tires so as to protect the same from wear and tear and to reinforce them and thus reduce the probability of blow outs to a minimum.

Another object of the invention is to provide a protector for pneumatic tires consisting of a metallic sectional casing which may be tightened on a tire by an adjustment of turn buckles and a heavy leather band encircling the metallic casing and secured thereto to prevent excessive noise and to provide a firmer grip on the roadway.

The invention also aims to generally improve pneumatic tire casings of this nature to render them more useful, practical, efficient and commercially desirable.

With these and other objects in view, as will become more apparent as the description proceeds, the invention consists in certain novel features of construction, combination and arrangement of parts as will be hereinafter fully described, illustrated and claimed.

In the drawings,

Figure 1 is a side elevation of a wheel and tire showing my protector secured to the tire.

Fig. 2 is a transverse sectional view on the plane of line 2—2 of Fig. 1.

Fig. 3 is a fragmentary sectional view through the protector on a plane at right angles to the plane of Fig. 2.

Fig. 4 is a fragmentary plan view showing the meeting ends of the protector.

Fig. 5 is a detail perspective view showing the laced ends of the leather band and the covering flap therefor, and Fig. 6 is a detail view of parts to be hereinafter more fully described.

Referring in detail to the drawings by numerals, 1 designates a pneumatic tire of standard construction to which is secured the protector designated as an entirety by the numeral 2. The protector includes an inner metallic casing or armor 3 which is formed of a plurality of overlapping transverse sections 5. The sections are made of relatively thin metal and are overlapped in such way as to present a smooth surface to the tire. If desired an endless strip or band 6 may be interposed between the tire and the metallic armor to protect the former.

A band or belt 7 preferably of heavy leather encircles the metallic casing 3 and the end portions 8 of each of the metallic sections 5 are bent inwardly into engagement with the outer face of the band and are secured thereto by rivets 9. Additional rivets 10 may be employed to connect the flexible band with the metallic casing and if desired these latter rivets may serve as a connecting means for holding lugs 11 in position on the band.

For the purpose of securing the metallic armor to a tire, I provide a pair of split rings or hoops 12 which extend through the guide ways formed by the bent end portions of the metallic sections 5 and which have their threaded terminal portions 13 connected by turn buckles 14. The end metallic sections 15 are of a reduced width adjacent their opposed sides to provide clearance space for the turn buckles 14 and a section 16 is riveted or otherwise secured to each reduced portion 17. When the turn buckles are tightened, the sections 16 will overlap so that a continuous metallic armor or casing is provided for the tire. The ends of the band 7 may be secured to respective end sections 16.

The ends of the flexible band or belt 7 are preferably secured to each other by lacing 18 and to cover and protect the lacing, I provide a flexible flap 19 which is permanently secured to the band adjacent one end thereof and which may be secured to the band adjacent the other end thereof by bolts or other suitable fasteners 20 which are connected to one of the metallic sections 15 and which extend through the band 7 and through the flap. It will be obvious that a plurality of openings may be provided in the flap 19 to receive the fasteners 20 in different positions of adjustment of the band.

It will be noted that the flexible band 7 takes the wear from the sections and by presenting a relatively soft tread surface to the road way prevents excessive noise such as is occasioned by unguarded metallic protectors.

From the foregoing description taken in connection with the accompanying drawings, it will be seen that I have provided a very practical and efficient pneumatic tire protector which may be manufactured at a relatively low cost and which is particularly efficient for the purpose intended. The protector is puncture proof; the lugs 11 make it non-skiddable; and the belt or band 7 coöperates with the lugs to render the device noiseless.

While I have shown and described the preferred embodiments of my invention, it will be clearly understood that I do not wish to be limited to this construction, but may make such changes as will fall within the scope and spirit of the invention as claimed.

What I claim is:—

1. In a tire protector, a casing comprising a plurality of sections, means for securing said casing to a tire, a flexible band encircling said casing, means connecting the ends of the band, and a flap secured to the band adjacent one end and adapted for connection with the band adjacent the other end to cover said connecting means.

2. In a pneumatic tire protector, a casing comprising a plurality of overlapping sections, means for securing said casing to a tire, a flexible band encircling said casing and secured to each of said sections, lacing connecting the ends of the band and a flap permanently secured to the band adjacent one end and adapted for connection with the band adjacent the other end to cover the lacing.

In testimony whereof I affix my signature.

HENRY HORTENSTINE.

Copies of this patent may be obtained for five cents each, by addressing the "Commissioner of Patents, Washington, D. C."